United States Patent [19]
Honma

[11] Patent Number: 5,944,240
[45] Date of Patent: Aug. 31, 1999

[54] CUP HOLDER

[75] Inventor: Hisayoshi Honma, Aichi, Japan

[73] Assignee: Nifco Inc., Yokohama, Japan

[21] Appl. No.: 08/953,373

[22] Filed: Oct. 17, 1997

[30] Foreign Application Priority Data

Feb. 27, 1997 [JP] Japan .................................. 9-044419

[51] Int. Cl.⁶ .................................................. B60N 3/10
[52] U.S. Cl. ........................ 224/281; 224/926; 224/552; 224/553
[58] Field of Search .................... 224/281, 282, 224/552, 553, 548, 926; 248/311.2; 297/188.17, 188.14; 296/37.12, 37.8

[56] References Cited

U.S. PATENT DOCUMENTS

| 4,953,771 | 9/1990 | Fischer et al. | 224/282 |
| 4,981,277 | 1/1991 | Elwell | 224/281 |
| 5,692,658 | 12/1997 | Fischer et al. | 224/926 |

Primary Examiner—Linda J. Sholl
Attorney, Agent, or Firm—Kanesaka & Takeuchi

[57] ABSTRACT

A cup holder of the invention includes a slider slidably situated in a housing, an arm pivotally attached to a lower side of the slider so that when the slider is pulled from the housing into a using position, a front portion of the arm descends, a supporting member pivotally attached to the front portion of the arm, at least one holding arm rotatably attached to the slider, and a link mechanism. The holding arm has a holding portion laterally rotated to form an inserting portion between the holding portion and the slider when the slider is moved to the using position, and a first pressing portion for rotating the holding portion in a direction away from the slider when the first pressing portion is pressed. The link mechanism is rotatably attached to the arm and has a second pressing portion in a rear portion. The second pressing portion moves forward along a movement of the slider to press the first pressing portion to force the holding portion to rotate in the direction away from the slider. The holding arm can take first and second positions for holding a different size container and can be easily actuated by the link mechanism.

8 Claims, 12 Drawing Sheets

CUP HOLDER

BACKGROUND OF THE INVENTION AND RELATED ART STATEMENT

The present invention relates to a cup holder, and particularly, to a cup holder which is disposed in, for example, a console box of an automobile, and holds an object, i.e. a container of beverage, such as a cup or can, not to fall.

As the aforementioned cup holder, various kinds of cup holders have been proposed already. For example, Japanese Utility Model Publication (KOKOKU) No. H3-12592 discloses a cup holder, wherein in case a holder portion is drawn from a housing for use, a holding member rotatably attached to the holder portion is rotated in the horizontal direction by an urging force of urging means, and stops at a neutral position of the urging means.

In case an object to be held is retained in the cup holder, an object, which is smaller than an inserting hole formed by the holder portion and the holding member where urging means is in the neutral position, can be inserted as it is, through the inserting hole and held thereat.

However, in case the object to be held is larger than the inserting hole in a condition that the urging member is in the neutral position, if, after the object to be held is inserted through the inserting hole while a distance between the holding member and the holder portion is expanded against the urging force of the urging means to be spaced apart from each other, the expanding force of the holder portion is released, the object can be held between the holding member and the holder portion.

Also, in the cup holder of the aforementioned Utility Model Publication, a supporting member for supporting the object to be held is rotatably attached to the holder portion. Generally, the supporting member is attached to a front end of an arm which is attached rotatably at a rear end to a lower side of the holder portion or a slider. When the holder portion or the slider is drawn from the housing to a using position, the front end of the arm is rotated to descend so as to allow the supporting member to horizontally descend.

In the conventional cup holder, since it is structured that the holding member is positioned in the neutral position by the urging member, such as a torsion spring, there was a difficulty such that upon attaching the holding member, the urging means is attached.

And, whenever an object with a size larger than that of the ordinary object is held, the holding member is required to be opened against the urging force of the urging means. Namely, since the holding member can not be maintained at the position for the large size object, the object can not be held by merely inserting the object into the inserting hole, so that it is difficult to use.

Furthermore, since the width of the supporting member is limited to a size entering into the opening of the housing, as described above, in case the holding member is opened against the urging force of the urging means to dispose a large object on the supporting member, a part of the bottom of the supported object exceeds the supporting member to become a condition that the object leans on the holding member. Thus, there is an inconvenience that the holder can not stably hold the object.

The invention has been made to obviate the above drawbacks, and an object of the invention is to provide a cup holder, in which a holding arm can be easily and simply attached.

Another object of the invention is to provide a cup holder as stated above, in which by changing a position of the holding arm to a first condition of use or a second condition of use, objects with different sizes can be held by simply inserting the same into the inserting holes.

A further object of the invention is to provide a cup holder as stated above, in which an entire bottom surface of a large object can be disposed on the supporting member.

Further objects and advantages of the invention will be apparent from the following description of the invention.

SUMMARY OF THE INVENTION

To achieve the aforementioned objects, the present invention provides a cup holder, wherein when a slider is pulled out to become a condition of use with respect to a housing, an arm attached to a lower side of the slider rotates at a rear end side such that a front end of the arm descends; a supporting member, which supports a bottom of an object to be held and is attached to a front end of the arm, rotates to descend horizontally; and a holding arm attached to the slider to be rotatable in the horizontal direction is moved away from the slider to form an inserting hole for holding the object to be held together with the slider.

In the cup holder of the invention, the holding arm includes a first pressing portion for rotating the holding arm in a direction away from the slider to form the inserting hole when the first pressing portion is pushed. Also, the cup holder includes a link mechanism having a second pressing portion in a rear end thereof, and a front end rotatably attached to the arm. When the second pressing portion moves forwardly along the slider, the first pressing portion is pushed so that the holding arm is rotated in the direction away from the slider.

Also, in the present invention, the supporting member is formed of a supporting member main body, side plates, and urging means. The supporting member main body has a width which allows the supporting member main body to enter into an opening of the housing. The side plates are attached to the supporting member main body to be movable outwardly in the width direction, and have cam surfaces abutting against the housing. The urging means urge the side plates outwardly in the width direction of the supporting member main body. In storing the slider into the housing, when the cam surfaces abut against the housing, the side plates overlap the supporting member main body and enter into the housing.

DETAILED DESCRIPTION OF PREFERRED EMBODIMENTS

Embodiments of the present invention will be explained with reference to the drawings attached herewith.

In the drawings, numeral 1 designates a housing made of plastics; 11 designates a leaf spring which is curved into an arch shape and formed of metal; 21 designates a latch mechanism; 31 designates a slider; 41L, 41R respectively designate a left elastic member and a right elastic member, which are made of plastics; 51L, 51R respectively designate a left holding arm and a right holding arm, which are made of plastics; 61 designates a plastic arm; 71 designates a plastic driver; 81 is a plastic link; and 91 designates a supporting member.

Figure 2:
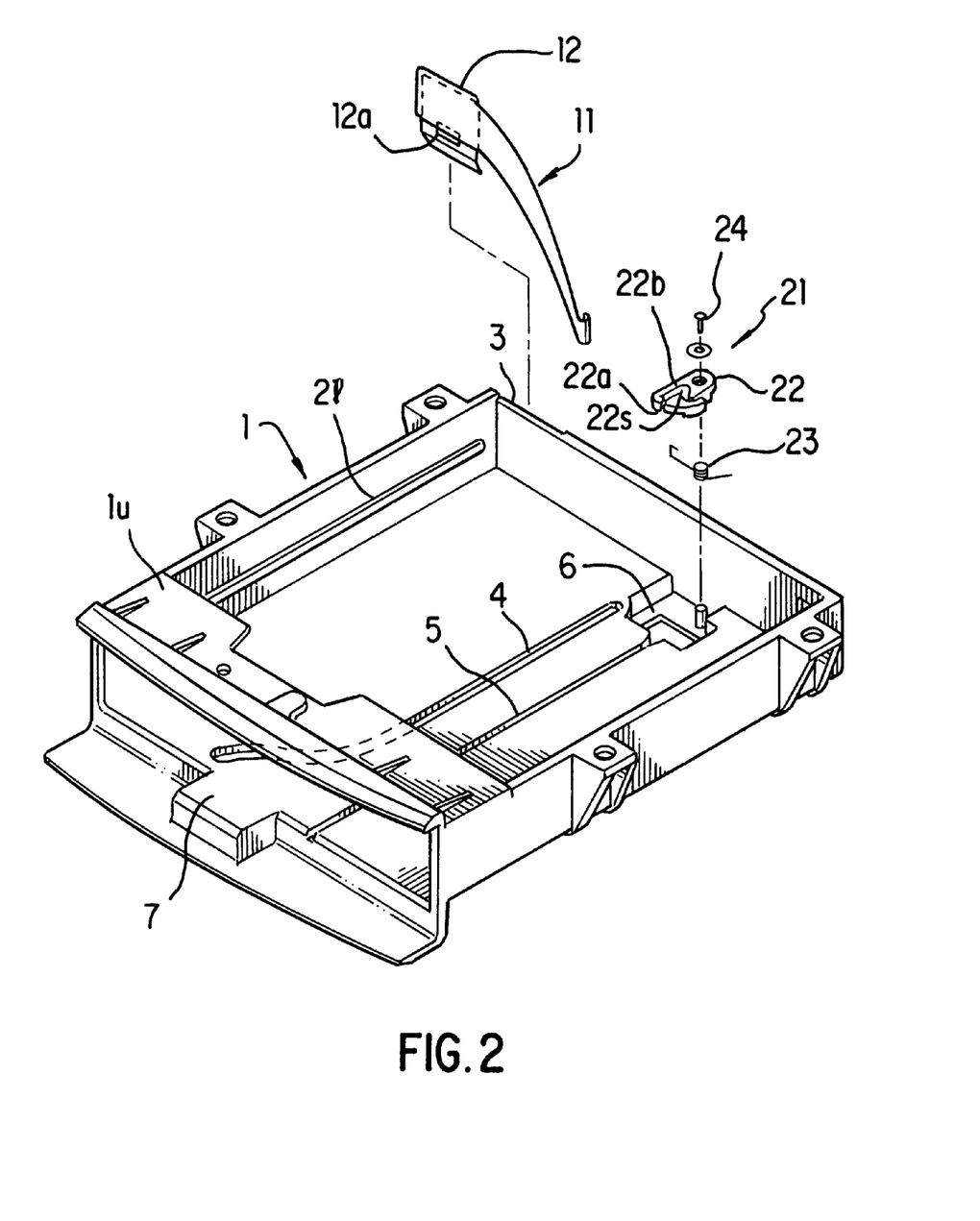
FIG. 2 is an exploded perspective view showing a housing, a leaf spring and a latch mechanism shown in FIG. 1.

The aforementioned housing 1 has a shape of a flat box, wherein a front surface is opened and an upper surface is opened except a connecting portion 1u.

And, inside right and left side walls, there are disposed left and right guide rails 2l and 2r for guiding a first slider 32 constituting a slider 31, and a thin portion 3 for attaching a leaf spring 11 is disposed at the left side of the rear wall.

Figure 7:
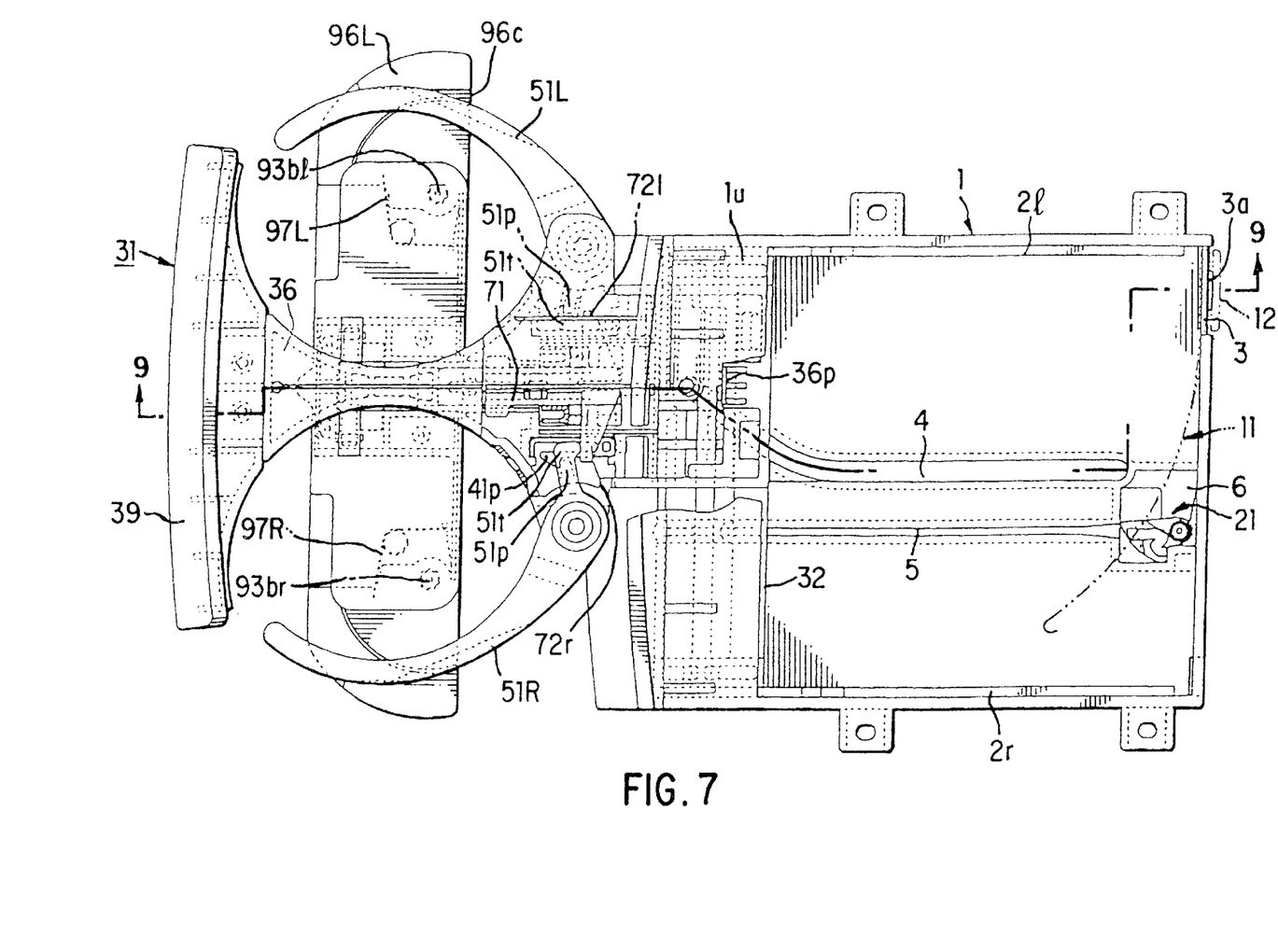
FIG. 7 is a plan view of the cup holder in which a part shown in FIG. 1 is taken out.

As shown in FIG. 7, a stopping projection 3a is disposed on a back surface of the thin portion 3.

Further, on an upper side of the bottom, there are provided a first guide groove 4 for guiding a boss 37b of a second slider 35, a second guide groove 5 extending in the front and rear directions through which pins 33f, 33b of the first slider 32 move, and a concave 6 which is provided for arranging the latch mechanism 21 and located at a rear side of the second guide groove 5 to communicate therewith.

Also, in front of the opening of the bottom, a convex 7 which controls rotations of the arm 61 in the up and down directions or vertical direction.

Incidentally, the first guide groove 4, in the direction from a front portion to rearwardly, curves gradually from left to right to be located in the center in the right and left directions, and then extends linearly rearwardly.

Both ends of the first guide groove 4 are located inside the bottom, and the second guide groove 5 reaches a front end of the bottom and opens thereat.

The aforementioned leaf spring 11 is for urging the slider 31 to a direction projecting from the housing 1, and one of the ends of the leaf spring 11 is bent to form a holding portion 12 which holds the thin portion 3 of the housing 1.

A portion of the holding portion 12 corresponding to the stopping projection 3a is provided with an engaging hole 12a for preventing the leaf spring 11 from falling off.

The aforementioned latch mechanism 21 is formed of a cam 22 having a curved surface 22a and a latch groove 22b, and a torsion spring 23 for urging the cam 22 in the counterclockwise direction. One end of the cam 22 through which a pin 33b enters is located at a right rear side of the curved surface 22a contacting the pin 33b of the slider 31, and the other end thereof through which a pin 33b comes out is located at a left front side of the curved surface 22a. Also, in the middle, the latch groove 22b having a stopping portion 22s for stopping the pin 33b is formed at the upper side of the cam 22.

Incidentally, in the condition that the cam 22 is urged in the counterclockwise direction by the torsion spring 23 to hit the housing 1, the cam 22 is swingably attached to the concave 6 of the housing 1 by the torsion spring 23 and an attachment screw 24, such that the other end of the latch groove 22b through which the pin 33b comes out is located in an extension line of the second guide groove 5.

Figure 3:
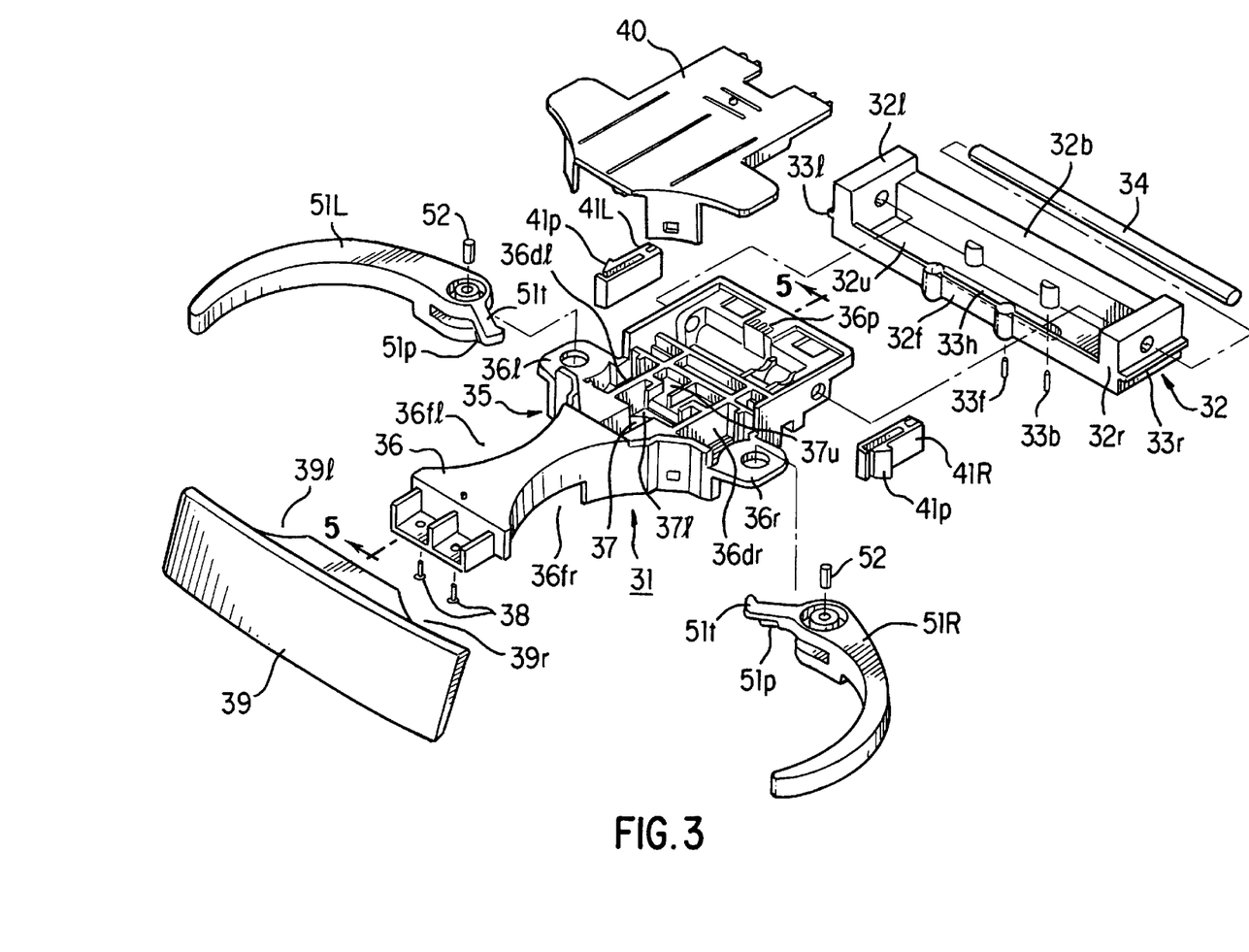
FIG. 3 is an exploded perspective view showing a slider, a holding arm, and an elastic member shown in FIG. 1.

The aforementioned slider 31 is formed of the plastic first slider 32 which moves in the front and rear directions with respect to the housing 1, and the second slider 35 which moves in the right and left directions along the metal guide bar 34 attached to the first slider 32 in the right and left directions.

The first slider 32 has an elongated square shape in the plan view, wherein right and left side walls 32l, 32r, and front and rear walls 32f, 32b are provided at four sides of a bottom plate 32u, and outside the left and right side walls 32l, 32r, there are disposed left and right projecting strips 33l, 33r which are guided by slidably contacting at the upper surfaces thereof the under surface of the left and right guide rails 2l, 2r. The bottom plate 32u is provided with a hole 33h, which covers the range of the right and left directions of the first guide groove 4, and through which a boss 37b of the second slider 35 can move in the right and left directions. In the lower side of the bottom plate 32u, metal pins 33f, 33b moving in the second guide groove 5 of the housing are disposed in the front and rear directions.

Incidentally, the height of the front wall 32f is set to be lower than the rear wall 32b.

The second slider 35 is formed of a plastic main body 36; a plastic front frame 39 attached by an attachment screw 38 to the front of the main body 36; and a plastic cover 40 attached to the main body 36. In the front left and right sides of the main body 36, there are disposed arcuate left and right notches 36fl, 36fr which form the inserting holes together with the front frame 39 and left and right holding arms 51L, 51R, and an engagement projection 36p is disposed at the upper rear portion of the main body 36. In the upper and the comparatively front side of the main body 36 between the left and right notches 36fl, 36fr and the engagement projection 36p, left and right dent portions 36dl, 36dr are disposed.

Figure 4:
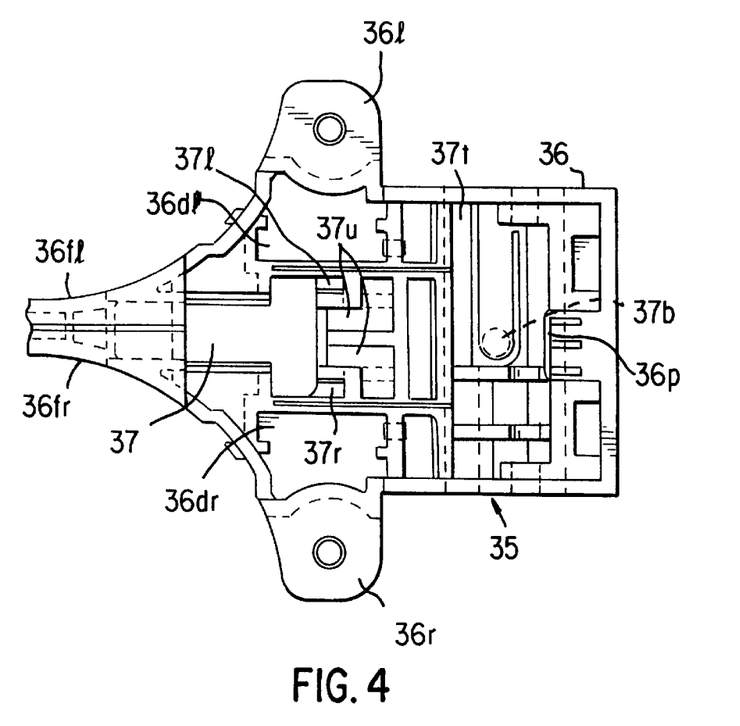
FIG. 4 is a plan view of a rear side of a main body constituting the slider.
Figure 5:
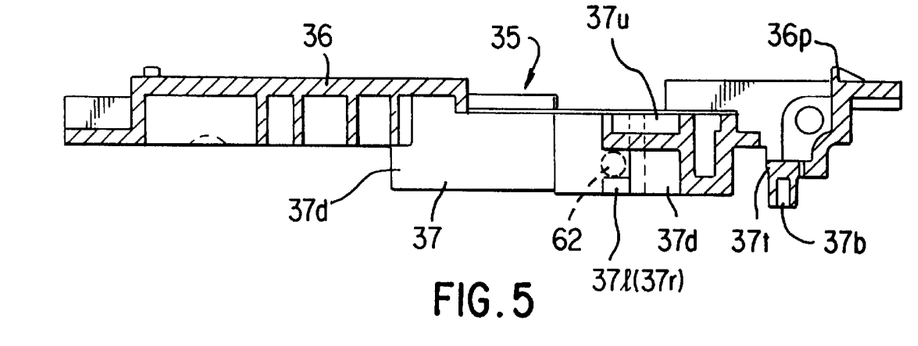
FIG. 5 is a sectional view of the main body taken along a line 5—5 in FIG. 3.

Also, outside left and right dent portions 36dl, 36dr of the main body 36, left and right attachment portions 36l, 36r are provided to extend in the horizontal direction, and between the left and right dent portions 36dl, 36dr, there is provided an opening 37 which opens in the up and down directions or vertical direction. In the rear of the upper side of the opening 37, a concave 37u extending continuously rearwardly from the opening 37 is disposed, and a concave 37d extending in the front and rear directions is formed continuously with the opening 37. Also, the lower rear side of the concave 37d is provided with left and right axis supporting members 37l, 37r for rotatably supporting axes 62 of the arm 61.

Also, in the lower side between the left and right dent portions 36dl, 36dr and between the opening 37 and the engagement projection 36p, there is provided an elastic piece 37t having the boss 37b, which projects downwardly at a lower surface of the swinging end and is guided by the first guide groove 4 of the housing 1.

Incidentally, the lower front part of the second slider 35 is notched such that the arm 61, the link 81 and the supporting member 91 can enter therein.

The left and right dent portions 36dl, 36dr, the opening 37, and the elastic piece 37t are covered by the cover 40.

Also, in the left and right of the rear of the front frame 39, there are formed left and right notches 39l, 39r which define the inserting holes together with the left and right notches 36fl, 36fr and the left and right holding arms 51L, 51R.

The left and right elastic members 41L, 41R are provided at the left and right dent portions 36dl, 36dr of the second slider 35, and respectively have a shape similar to U. A projection 41p is formed at a front end of the elastic piece portion which is located outside.

Holding portions of the left and right holding arms 51L, 51R have arc shapes, and base ends of the holding arms are attached to the left and right attachment portions 36l, 36r of the second slider 35 by spring pins 52 so as to be rotatable in the horizontal direction. At the opposite sides of the holding portions at the base ends, there are provided pressing portions 51t, and at the lower sides of the pressing portions 51t, engaging portions 51p, which act relative to the projections 41p of the left and right elastic members 41L, 41R, are formed.

Figure 8:
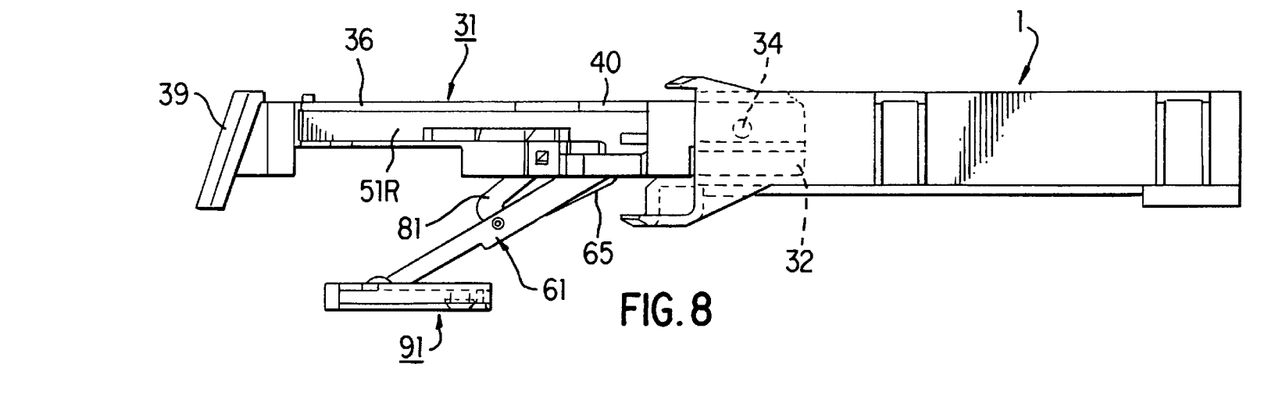
FIG. 8 is a right side view of the cup holder shown in FIG. 1.
Figure 9:
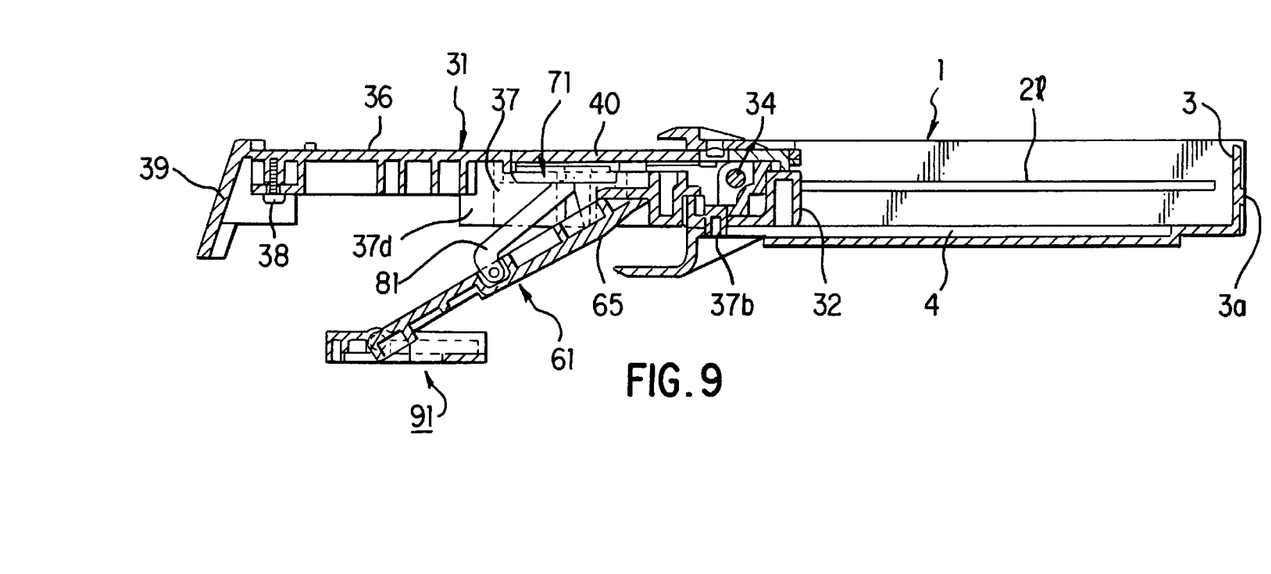
FIG. 9 is a sectional view taken along a line 9—9 in FIG. 7.
Figure 10:
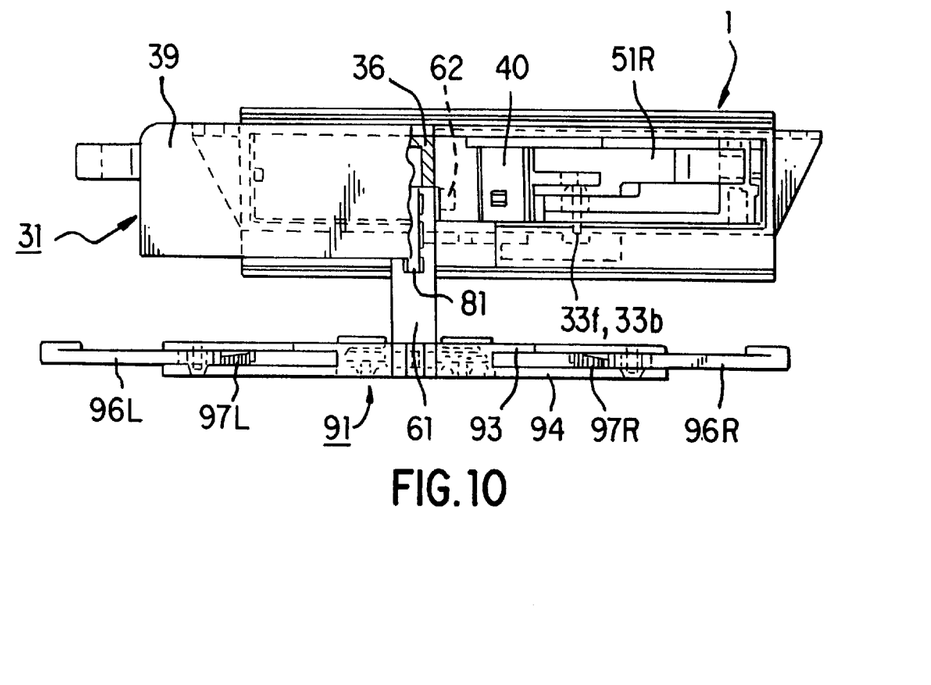
FIG. 10 is a front view of the cup holder in which a right half of the slider is shown as a sectional view.
Figure 12:
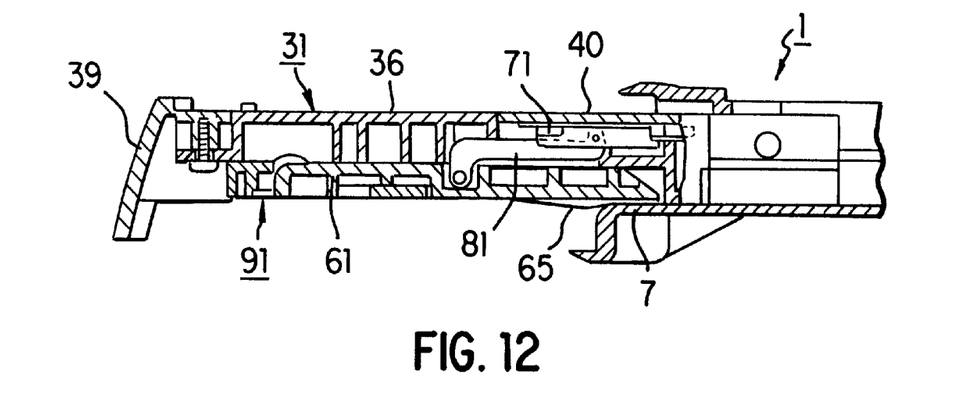
FIGS. 12–14 are explanatory views for explaining operations when the slider in a condition of FIG. 1 is stored in the housing.

In the arm 61, at the right and left of the rear end thereof as the base end, there are provided the axes 62 rotatably supported by the left and right axis supporting members 37l, 37r when entering into the concave 37d of the main body 36, and at the right and left of the front end of the arm as the rotating side, there are provided axes 63 rotatably supporting the supporting member 91, and left and right stoppers 64l, 64r which support the supporting member in the horizontal condition. On the lower surface of the arm 61, as shown in FIGS. 8, 9 and 12, a control projecting strip 65 is disposed.

Figure 6:
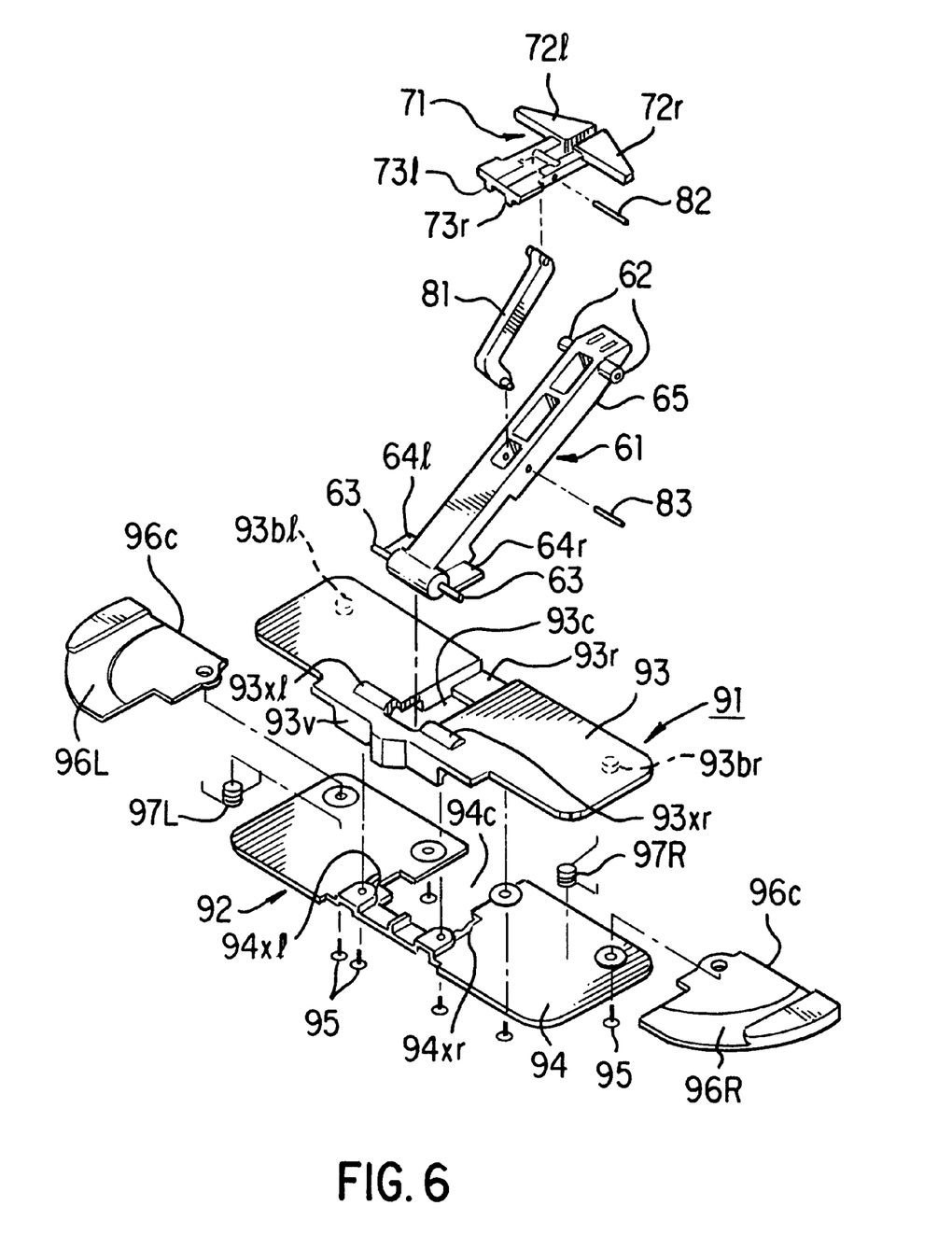
FIG. 6 is an exploded perspective view showing an arm, a driver, a link, and a supporting member shown in FIG. 1.

Incidentally, the lower part of the front of the arm 61 is notched such that the supporting member 91 can enter therein.

The driver 71 has a T shape in a plan view, and at the left and right of the rear portion, left and right pressing portions 72l, 72r for pressing the pressed portions 51t of the left and right holding arms 51L, 51R. At the left and right of the lower surface of the driver, left and right projecting strips 73l, 73r, which slidably contact the inner surfaces of the left and right side walls in the opening 37 and the concave 37u of the second slider 35, are disposed in the front and rear directions.

The link 81 is provided to connect the driver 71 and the arm 61, wherein the rear end of the link is rotatably attached to the substantial center of the driver 71 by a spring pin 82, and the front end of the link is rotatably attached to the substantial center of the arm 61 by a spring pin 83.

The supporting member 91 is formed of a supporting member main body 92 having the width slightly smaller than the opening width of the housing 1; left and right plastic rotating side plates 96L, 96R which are held in the main body 92 and project from the main body 92 to the right and left while rotating in the horizontal direction; and torsion springs 97L, 97R which urge the left and right plastic rotating side plates 96L, 96R toward the projecting directions.

The supporting member main body 92 is formed of a plastic upper plate 93 having the width slightly smaller than the opening width of the housing 1; a plastic lower plate 94 having the width substantially the same as that of the upper plate 93; and attachment screws 95 for attaching the lower plate 94 and the upper plate 93 in a condition that these plates are laminated.

At the central part in the right and left directions of the upper and lower plates 93, 94, there are formed notches 93c, 94c extending in the rear end direction, and in the rear of the notch 93, a connecting portion 93r entering in the notch 94c. Inside the right and left front portions of the notches 93c, 94c, there are provided left and right axis supporting portions 93xl, 93xr, 94xl, 94xr engaging the axes 63 of the arm 61, and in the left and right rear portions of the lower surface of the upper plate 93, there are disposed left and right bosses 93bl, 93br which respectively become centers of rotations of the left and right rotating side plates 96L, 96R.

Incidentally, in order to provide a predetermined space between the upper plate 93 and the lower plate 94 in the condition that the lower plate 94 is attached to the upper plate 93, suspending portions 93v are formed in the front and rear of the upper plate 93, and the suspending portion 93v, which is located in the rear side and is not shown in the figures, also functions as stoppers for the left and right rotating side plates 96L, 96R.

Also, the rear surfaces of the left and right rotating side plates 96L, 96R in the condition shown in FIG. 7 become cam surfaces 96c abutting against the housing 1.

Next, an example of assembly will be explained.

Firstly, the latch mechanism 21 is attached to the concave 6 of the housing 1.

Then, the thin portion 3 of the housing 1 is inserted into the holding portion 12 of the leaf spring 11, and the stopping projection 3a is engaged with the engaging hole 12a.

And, the lower surface of the upper plate 93 is faced up, and the axes 63 of the arm 61 are inserted into the notch 93c from the lower side to be placed at the left and right axis supporting portions 93xl, 93xr, while the arm 61 is inserted into and along the notch 93c.

Then, after the left and right bosses 93bl, 93br are inserted into the left and right rotating side plates 96L, 96R, both ends of the torsion springs 97L, 97R are respectively fixed to the left and right rotating side plates 96L, 96R and the upper plate 93.

Further, the lower plate 94 is laminated on the upper plate 93 from the upper side, and after the left and right axis supporting portions 94xl, 94xr are placed on the left and right of the axes 63, the lower plate 94 and the left and right rotating side plates 96L, 96R are attached to the upper plate 93 by the attachment screws 95.

Figure 13:
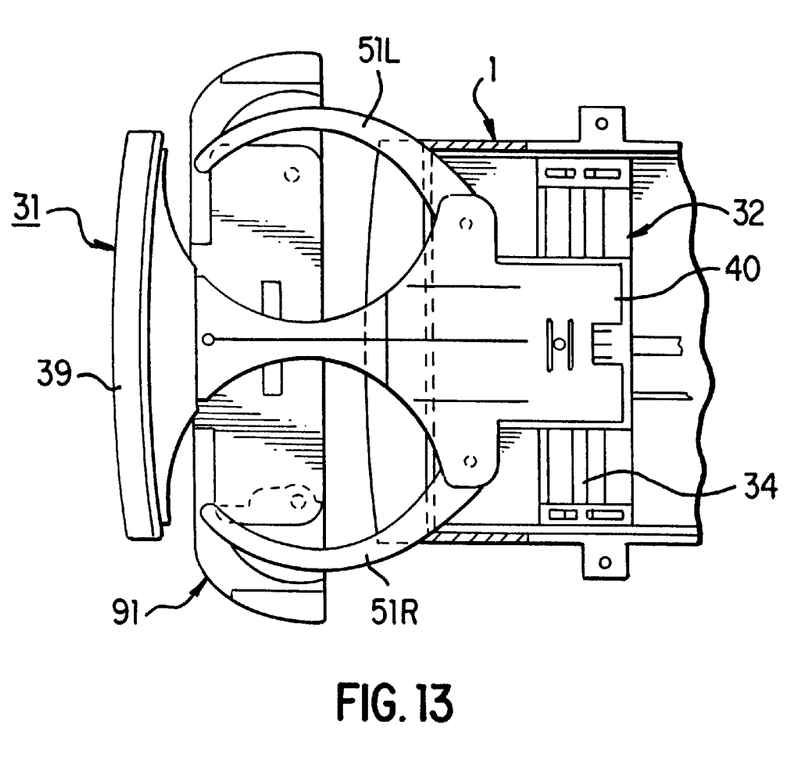

As described above, when the lower plate 94 and the left and right rotating side plates 96L, 96R are attached to the upper plate 93, the left and right rotating side plates 96L, 96R are urged by the torsion springs 97L, 97R, and are extended to the right and left of the upper and lower plates 93, 94 as shown in FIG. 13, so as to extend more than the opening width of the front surface of the housing 1.

Next, after the front frame 39 is attached to the front end portion of the second slider 35 by the attachment screws 38, the left and right elastic members 41L, 41R, in the condition that the projections 41p face outside and front, are inserted into the left and right dent portions 36dl, 36dr.

Then, the left and right attachment portions 36l, 36r are inserted into the base ends with C-shapes in side views of the left and right holding arms 51L, 51R, and the left and right holding arms 51L, 51R are rotatably attached to the left and right attachment portions 36l, 36r by the spring pins 52.

Accordingly, the left and right elastic members 41L, 41R are prevented from falling off by the respective pressing portions 51t, so that the respective engaging portions 51p come to a condition of slidingly contacting the elastic piece portions of the left and right elastic members 41L, 41R.

And, after the rear end of the link 81 is rotatably attached to the driver 71 by the spring pin 82, the front end side of the link 81 is inserted into the opening 37 of the main body 6, and the left and right projecting strips 73l, 73r are inserted inside the left and right side walls of the opening 37 and the concave 37u and placed on the main body 36. Then, the cover 40 is attached to cover the left and right dent portions 36dl, 36dr and the opening 37.

Then, the front end of the link 81 is rotatably attached to the arm 61 by the spring pin 83, and the axes 62 are inserted into the concave 37d from the lower side of the opening 37 to be placed on the left and right axis supporting members 37l, 37r.

Next, the boss 37b of the main body 36 is inserted into the hole 33h of the first slider 32 such that the rear end portion of the main body 36 is placed on the first slider 32.

Then, the guide bar 34 is disposed to pass through from the right side wall 32r, the main body, and the left side wall 32l.

Next, the second slider 35 is moved with respect to the first slider 32 such that the boss 37b of the slider 31 as assembled above corresponds to the convex 7 of the housing 1; the left and right projected strips 33l, 33r are placed under the left and right guide rails 2l, 2r; the rear end of the first slider 32 is placed at the opening of the housing 1; and the front frame 39 is pushed to urge the first slider 32 into the housing 1. Accordingly, the boss 37b hits the convex 7 to ascend by the elasticity of the elastic piece 37t. Since the engagement projection 36p pushes up the connecting portion 1u to slightly deform the housing 1, the first slider 32 is inserted into the housing 1.

When the engagement projection 36p passes the connecting portion 1u, the connecting portion 1u returns to the original condition, so that the engagement projection 36p and the connecting portion 1u face against each other at the height to contact with each other.

Also, when the boss 37b moves along the bottom of the housing 1 and reaches the position of the first guide groove 4, the boss 37b enters into the first guide groove 4 by the elasticity of the elastic piece 37t.

Further, the pins 33f, 33b disposed at the lower side of the first slider 32 enter into the second guide groove 5.

In the condition as assembled above, when the front frame 39 is held and pulled, the boss 37b is guided by the first guide groove 4. The second slider 35 moves along the guide bar 34 to the left end in the second slider 32, and the engagement projection 36p hits the connecting portion 1u and stops.

When the slider 31 is pulled as described above, since the axes 62 come out of the housing 1, the arm 61 rotates around the axes 62 such that the front side thereof descends, and the rear end part of the arm hits the main body 36. Accordingly, as shown in FIGS. 1, 8 through 10, the supporting member 91 is horizontally supported.

And, when the arm 61 rotates around the axes 62 such that the front side thereof descends, the link 81 rotates and the driver 71 connected to the link 81 moves toward the front on the main body 36. Thus, the left and right pressing portions 72l, 72r actuate to rotate the left and right holding arms 51L, 51R to the condition that the pressing portions 51t of the left and right holding arms 51L, 51R are held between the left and right pressing portions 72l, 72r and the projections 41p of the left and right elastic members 41L, 41R, respectively, so that the left and right holding arms 51L, 51R are moved away from the main body 36 to become a first condition of use as shown in FIGS. 1 and 7.

Therefore, when beverage containers, such as cups or cans, are inserted or placed in the inserting holes formed by the left and right notches 36fl, 36fr, 39l, 39r and the left and right holding arms 51L, 51R, the supporting member 91 located below supports the whole bottom surfaces of the beverage containers. Thus, the beverage containers can be held in the stable condition without falling.

Figure 1:
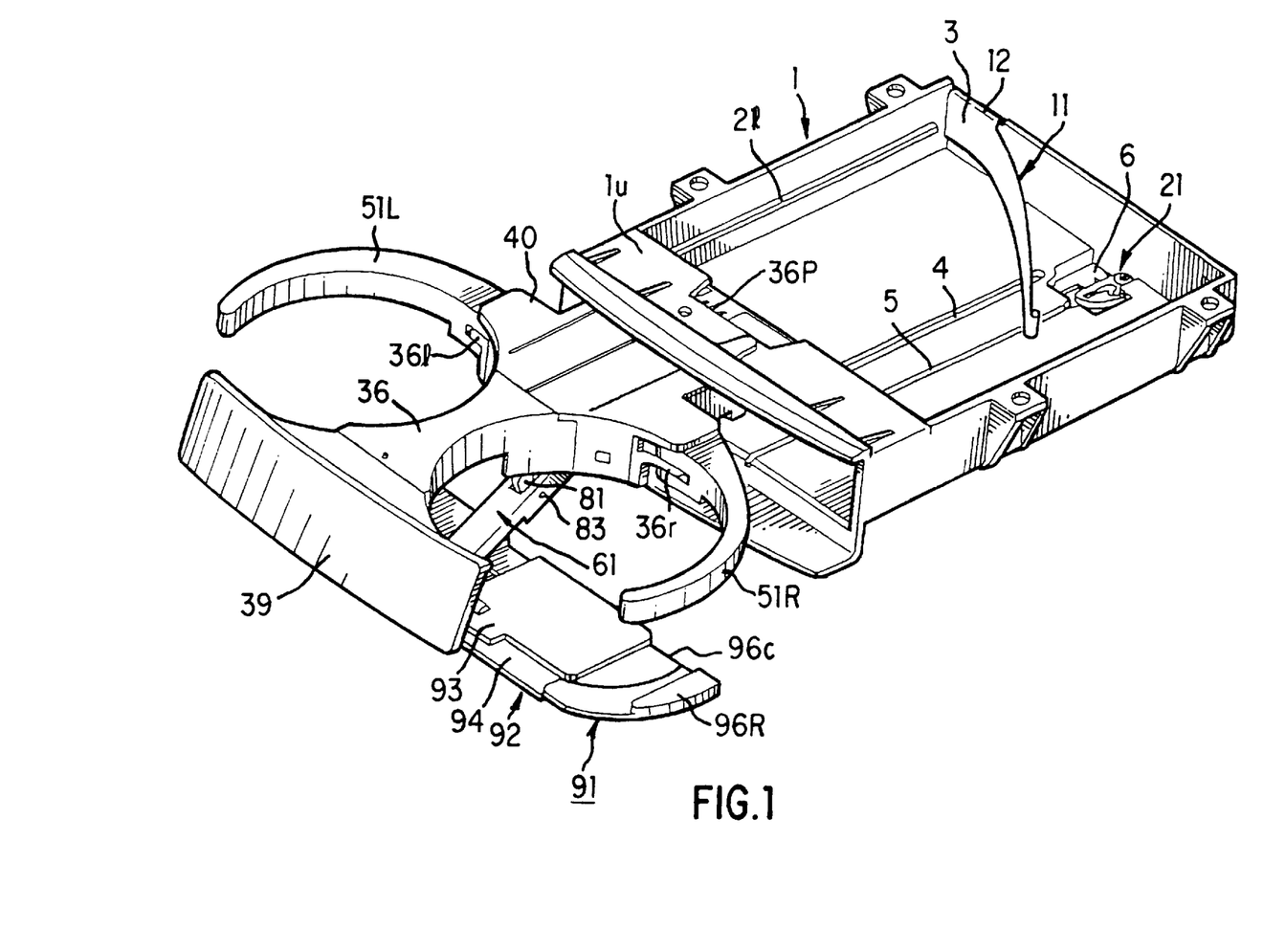
FIG. 1 is a perspective view of one embodiment of the invention showing a first condition of use of a cup holder.
Figure 11:
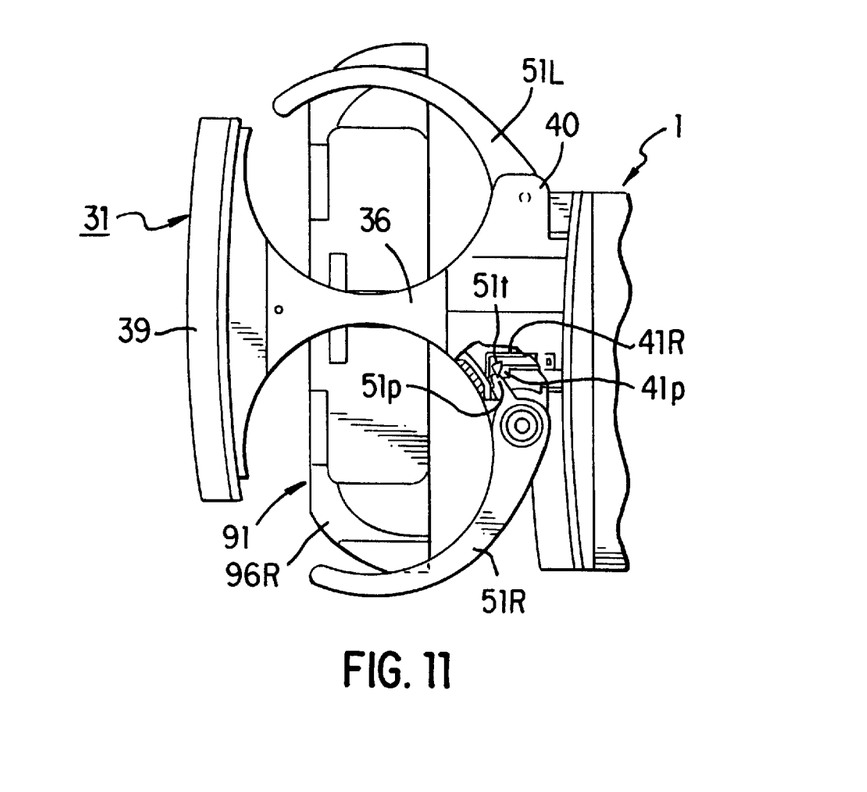
FIG. 11 is a plan view of a part of the cup holder in a second condition of use.

Here, in case the beverage container is large and can not be held in the first condition of use as shown in FIGS. 1 and 7, for example, if the rotating side of the right holding arm 51R is held and rotated to the outside, the engaging portion 51p presses the projection 41p to bend the right elastic member 41R. Accordingly, the right holding arm 51R rotates such that the engaging portion 51p moves or crosses over the projection 41p, and when the engaging portion 51p moves over the projection 41p, the projection 41p returns to the original condition by the elasticity of the right elastic member 41R. Thus, as shown in FIG. 11, the engaging portion 51p is positioned by the main body 36 and the projection 41p, and it comes to a second condition of use in which the larger beverage container is held.

As described above, even if the larger beverage containers are held, since the left and right rotating side plates 96L, 96R are projected at the left and right of the supporting member main body 92, the entire bottom surfaces of the larger beverage containers can be supported and held in the stable condition without falling.

Also, in order to hold the regular-size beverage container, by holding and rotating the rotating side of the right holding arm 51R to the inside, it is possible to return the right holding arm 51R to the first condition of use.

Next, operations for storing the slider 31 will be explained.

When the slider 31 is pushed to the direction of the housing 1 from the first condition of use shown in FIGS. 7 through 10, the first slider 32 is guided by the left and right guide rails 2l, 2r and retreats, and the second slider 35 retreats while the boss 37b is guided by the first guide groove 4.

In the process that the slider 31 retreats as described above, firstly, when the control projecting strip 65 hits the convex 7, the arm 61 rotates around the axes 62, so that the front side of the arm ascends and enters into the lower side of the main body 36. Since the front side of the supporting member 91 is pushed by the main body 36 and the rear side of the supporting member ascends to become horizontal, as shown in FIG. 12, the arm 61 and the supporting member 91 are stored or held inside the main body 36.

And, by rotating the arm 61 around the axes 62 such that the front side of the arm 61 ascends, the link 81 is rotated, and the driver 71 connected to the link 81 moves on the main body 36 to the rear end, and becomes not to press the pressed portions 51t of the left and right holding arms 51L, 51R.

Further, when the slider 31 retreats, since the outer surfaces of the left and right holding arms 51L, 51R hit the side walls of the housing 1 as shown in FIG. 13, the left and right holding arms 51L, 51R rotate around the spring pins 52 toward the main body 36 to be located inside the housing 1.

Figure 14:
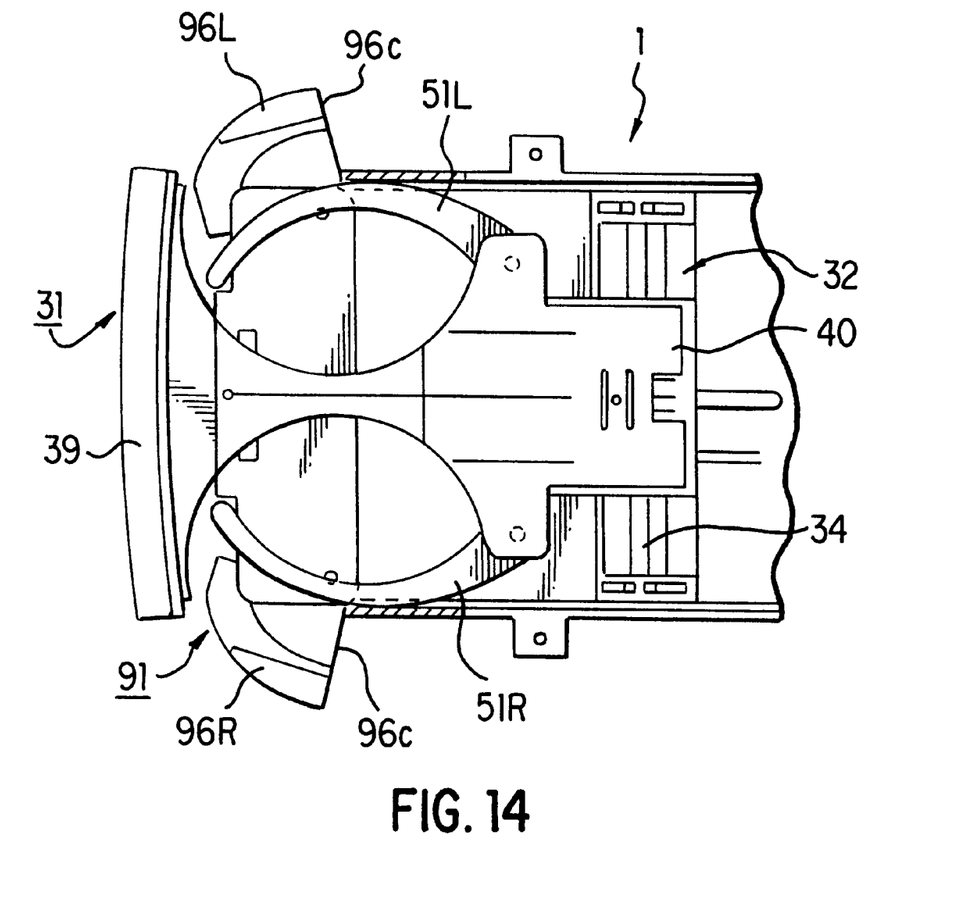

Further, when the slider 31 retreats, the rear end of the first slider 32 abuts against the leaf spring 11, and the cam surfaces 96c of the left and right rotating side plates 96L, 96R hit the side walls of the housing 1 as shown in FIG. 14. Thus, the left and right rotating side plates 96L, 96R rotate inwardly around the left and right bosses 93bl, 93br against the urging forces of the torsion springs 97L, 97R to be located inside the housing 1, and enter into the supporting member main body 92.

Furthermore, when the slider 31 retreats, the pin 33b comes out from the second guide groove 5 and pushes the curved surface 22a of the cam 22, so that the cam 22 rotates around the attachment screw 24 against urging force of the torsion spring 23. Accordingly, the pin 33b enters into the latch groove 22b from the rear.

Figures 15, 16:
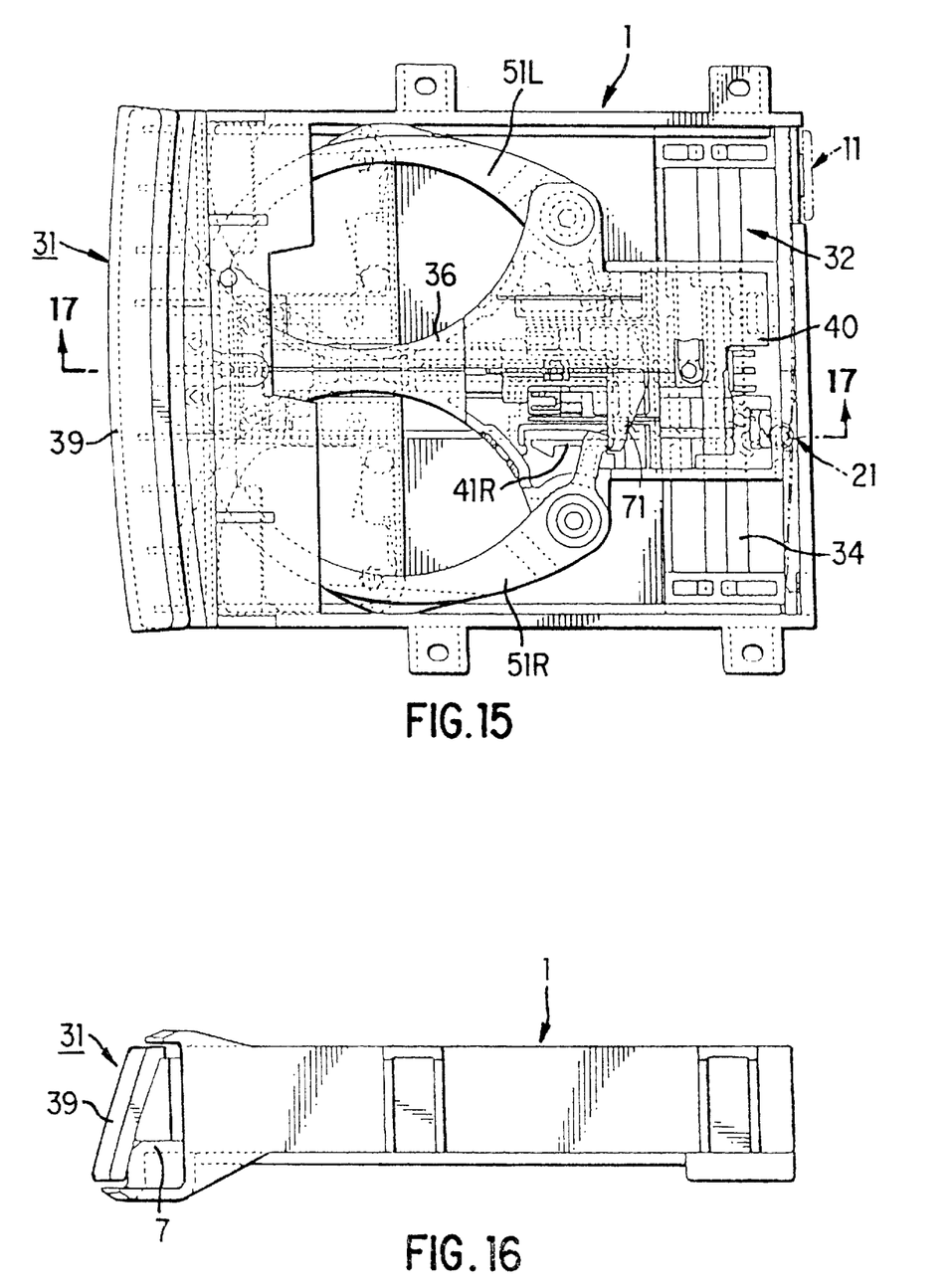
FIG. 15 is a plan view showing a condition that the slider shown in FIG. 1 is stored in the housing and a cover is removed.
FIG. 16 is a right side view of FIG. 15.
Figure 17:
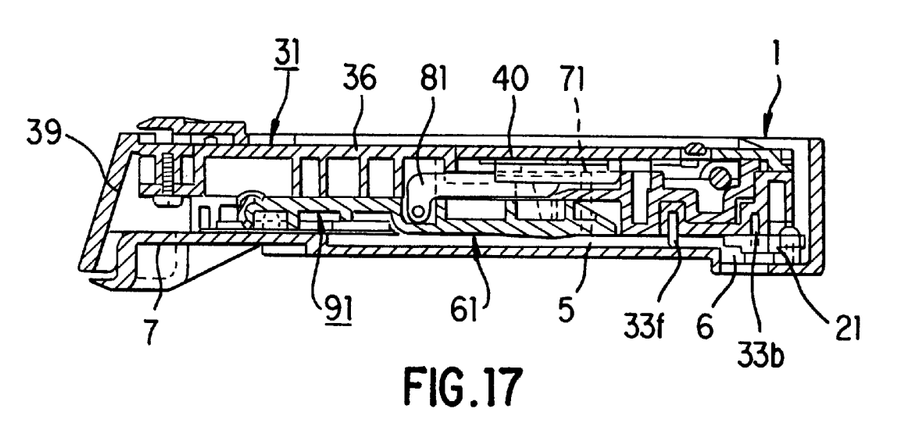
FIG. 17 is a part of a sectional view taken along a line 17—17 in FIG. 15.

When the pressing force of the slider 31 is released, the pin 33b proceeds in the latch groove 22b and engages the stopping portion 22s, so that the slider 31 can be stored in the housing 1 as shown in FIGS. 15 through 17.

Next, operations for pulling the slider 31 will be explained.

When the slider 31 is pushed toward the housing 1 from the stored condition shown in FIGS. 15 through 17, the pin 33b proceeds in the direction to come out of the latch groove 22b from the stopping portion 22s. Since the pin 33b comes out from the latch groove 22b while pressing down the front side of the cam 22 against the urging force of the torsion spring 23, the slider 31 is moved toward the direction projecting from the housing 1 by the urging force of the leaf spring 11, i.e. toward the front of the housing 1.

The slider 31 proceeds, and the distal ends of the left and right rotating side plates 96L, 96R are moved to the distal ends of the side walls of the housing 1. Since the left and right rotating side plates 96L, 96R are urged by the torsion springs 97L, 97R, as the slider 31 proceeds, the left and right rotating side plates 96L, 96R rotate around the left and right bosses 93bl, 93br toward the outside. After the condition of FIG. 14, the left and right rotating side plates 96L, 96R come to the condition of FIG. 13.

At this point, there is no urging force of the leaf spring 11. Therefore, when the front frame 39 is held and the slider 31 is pulled out, the boss 37b is guided by the first guide groove 4 and the second slider 35 moves toward left. When the slider 31 passes the position shown in FIG. 12, the control projecting strip 65 comes to a position ahead of the convex 7. Therefore, as described before, the arm 61 rotates around the axes 62 such that the front of the arm descends and the rear end of the arm hits the main body 36, so that the supporting member 91 is horizontally supported as shown in FIG. 1 and FIGS. 8 through 10.

And, since the arm 61 rotates around the axes 62 such that the front of the arm descends, the link 81 rotates also, and the driver 71 connected to the link 81 moves forward on the main body 36. Accordingly, the left and right holding arms 51L, 51R are rotated to the condition that the left and right pressing portions 72l, 72r and the projections 41p of the left and right elastic members 41L, 41R hold the pressing portions 51t of the left and right holding arms 51L, 51R, the left and right holding arms 51L, 51R are located away from the main body 36 to become the first condition of use as shown in FIGS. 1 and 7.

Incidentally, since the projection 36p hits the connecting portion 1u, pulling of the slider 31 is stopped.

As described above, according to the embodiment of the invention, since the left and right holding arms 51L, 51R are rotated to be located away from the main body 36 by the link 81 corresponding to the descending operation of the arm 61 and the driver 71 without using urging means, it is required to simply attach the left and right holding arms 51L, 51R to the main body 36. Therefore, the attachment of the left and right holding arms 51L, 51R can be simply and easily made.

And, the driver 71 does not press the left and right holding arms 51L, 51R according to the ascending operation of the front of the arm 61, and the left and right holding arms 51L, 51R are not urged by the urging means toward the expanding directions. Therefore, storing of the left and right holding arms 51L, 51R into the housing 1 can be smoothly made.

Also, the left and right holding arms 51L, 51R can be fixed by the left and right elastic members 41L, 41R to the first condition of use in which the inserting hole is small, and to the second condition of use in which the inserting hole is larger than the inserting hole in the first condition of use. Thus, by selecting the size of the inserting hole to the first condition of use or the second use condition, the objects with different sizes can be held easily in the inserting hole.

Furthermore, the supporting member 91 is constructed such that the supporting member main body 92 is provided with the left and right rotating side plates 96L, 96R, which move outwardly of the width direction and expand more than the opening width of the front of the housing 1. Therefore, even if the larger sized object is held, the entire bottom thereof can be placed on the supporting member 91. It is possible to hold the object stably without falling.

In the aforementioned embodiment, although the slider 31 is structured such that the second slider 35 can move left and right with respect to the first slider 32, it is possible to form the slider to move only in the front and rear directions with respect to the housing.

In this case, the first slider 32 and the main body 3 may be structured integrally, and the first guide groove 4, the elastic piece 37t and the boss 37b may be omitted.

And, although it is structured that the left and right pressing portions 72l, 72r of the driver 71 are guided by the main body 36 and the cover 40, the main body 36 may have a guide which functions as in the above case.

Although the link mechanism is formed of the driver 71 and the link 81, axes may be formed at the right and left portions of the rear end of the link 81 to constitute pressing portions, so that the link mechanism can be formed of a single member.

Further, although the supporting member main body 92 is formed of the upper plate 93 and the lower plate 94, it may be formed of a single plate and a bearing for holding the axes 63 of the arm 61 together with the plate.

And, although the left and right rotating side plates 96L, 96R are provided as the side plates, it may be plates which project in the right and left directions of the supporting member main body 92 by urging means and the rear surface has a cam surface inclining to the front as the rear surface is located away from the supporting member main body 92. This structure can operate similarly.

As described above, according to the present invention, since the supporting arms are rotated in the directions away from the slider by the link mechanism in association with the descending operation of the front end of the arm without using the urging means, it is simply required to attach the holding arms to the slider. Thus, the attachment of the holding arms can be simply and easily made.

Also, the link mechanism does not press the holding arms according to the ascending operation of the front of the arm, and the holding arms are not urged by urging means toward the expanding directions. Thus, the holding arms can be smoothly stored into the housing.

Also, the holding arms can be fixed by the elastic members to the first condition of use in which the inserting hole is small, and to the second condition of use in which the inserting hole is larger than the inserting hole in the first condition of use. Thus, by adjusting the size of the inserting hole to the first condition of use or the second use condition, the objects with different sizes can be held by simply inserting the object into the inserting hole.

Furthermore, since the supporting member main body is provided with the side plates which move outwardly of the width direction and expand the width of the receiving surface of the object to be held more than the opening width of the front of the housing, the entire bottom of the object can be placed on the supporting member even in the large size object. Therefore, the object can be held stably without falling.

While the invention has been explained with reference to the specific embodiments of the invention, the explanation is illustrative and the invention is limited only by the appended claims.

What is claimed is:

1. A cup holder comprising:

a housing, a slider laterally slidably situated in the housing, an arm having front and rear portions, said rear portion being pivotally attached to a lower side of the slider so that when the slider is pulled from the housing into a using position, the front portion descends, a supporting member pivotally attached to the front portion of the arm, said supporting member horizontally extending, at least one holding arm rotatably attached to the slider, said holding arm having a holding portion laterally rotated to form an inserting portion between the holding portion and the slider when the slider is moved to the using position, and a first pressing portion for rotating the holding portion in a direction away from the slider when the first pressing portion is pressed, and a link mechanism having a second pressing portion in a rear portion thereof, and a front end rotatably attached to the arm between a connecting portion of the arm to the slider and the front portion of the arm, said second pressing portion moving forward along a movement of the slider to press the first pressing portion to force the holding portion to rotate in the direction away from the slider.

2. A cup holder according to claim 1, wherein said holding arm includes an engaging portion disposed near the first pressing portion, said slider having an elastic piece with a projection near the holding arm so that when the engaging portion is held between the second pressing portion and the projection of the elastic piece, the holding portion is fixed in a first condition of use to form a first size between the holding portion and the slider, and when the engaging portion is moved to pass over the elastic piece, the holding portion is fixed in a second condition of use to form a second size greater than the first size between the holding portion and the slider.

3. A cup holder according to claim 2, wherein said holding arm is freely rotationally attached to the slider without having urging means between the slider and the holding arm.

4. A cup holder according to claim 2, wherein said elastic piece is formed separately from the slider and is fixed to the slider, said projection being formed at one end of the elastic piece and projecting laterally therefrom.

5. A cup holder according to claim 1, wherein said link mechanism includes a link having a first end attached to the arm and a second end, and a driver pivotally attached to the second end and slidably disposed on the slider, said driver having said second pressing portion.

6. A cup holder according to claim 1, wherein said supporting member includes a main body having a width to allow the main body to enter into an opening of the housing, side plates attached to the main body to be movable outwardly in a width direction and having cam surfaces to abut against the housing, and urging means attached to the side plates for urging the side plates outwardly in the width direction so that when the cam surfaces abut against the housing upon storing the slider into the housing, the side plates overlap the main body to allow the main body and the side plates overlapping together to enter into the housing.

7. A cup holder comprising:

a housing, a slider laterally slidably situated in the housing, an arm having front and rear portions, said rear portion being pivotally attached to a lower side of the slider so that when the slider is pulled from the housing into a using position, the front portion descends, at least one holding arm rotatably attached to the slider, said holding arm having a holding portion laterally moved to form an inserting portion between the holding portion and the slider when the slider is moved to the using position, and a supporting member pivotally attached to the front portion of the arm to descend when the slider is moved to the using position, said supporting member including a main body having a width to allow the main body to enter into an opening of the housing, side plates attached to the main body to be movable outwardly in a width direction and having cam surfaces to abut against the housing, and urging means attached to the side plates for urging the side plates outwardly so that when the cam surfaces abut against the housing upon storing the slider into the housing, the side plates overlap the main body to allow the main body and the side plates overlapping together to enter into the housing.

8. A cup holder according to claim 7, wherein said side plates are rotationally attached to the main body.

* * * * *